(12) United States Patent
Cutler

(10) Patent No.: US 6,290,847 B1
(45) Date of Patent: Sep. 18, 2001

(54) GRAVITY-FLOW WATER FILTRATION DEVICE

(75) Inventor: Willard A. Cutler, Big Flats, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 09/461,795

(22) Filed: Dec. 15, 1999

Related U.S. Application Data

(60) Provisional application No. 60/112,574, filed on Dec. 17, 1998.

(51) Int. Cl.[7] .................................. C02F 1/42; C02F 1/44
(52) U.S. Cl. ..................... 210/254; 210/262; 210/266; 210/282; 210/289; 210/316; 210/317; 210/436; 210/472; 210/502.1; 210/510.1
(58) Field of Search .................................. 210/188, 254, 210/262, 266, 282, 289, 316, 317, 436, 472, 502.1, 510.1

(56) References Cited

U.S. PATENT DOCUMENTS

| | | |
|---|---|---|
| 4,329,162 | 5/1982 | Pitcher, Jr. . |
| 4,428,758 | 1/1984 | Montierth . |
| 4,540,489 | 9/1985 | Barnard . |
| 4,636,307 * | 1/1987 | Inoue et al. .......................... 210/188 |
| 4,781,831 | 11/1988 | Goldsmith . |
| 4,894,160 | 1/1990 | Abe et al. . |
| 5,009,781 | 4/1991 | Goldsmith . |
| 5,114,581 | 5/1992 | Goldsmith et al. . |
| 5,128,036 | 7/1992 | Svensson . |
| 5,198,007 | 3/1993 | Moyer et al. . |
| 5,275,729 * | 1/1994 | Gris ...................................... 210/472 |
| 5,451,444 | 9/1995 | DeLiso et al. . |
| 5,597,617 | 1/1997 | DeLiso et al. . |
| 5,681,463 * | 10/1997 | Shimizu et al. ...................... 210/266 |
| 5,733,451 * | 3/1998 | Coelner et al. ................... 210/502.1 |
| 6,159,363 * | 12/2000 | Collins et al. ......................... 210/136 |

FOREIGN PATENT DOCUMENTS

| | | | |
|---|---|---|---|
| 0 745 416 | 12/1996 | (EP) . | |
| 0 792 676 | 9/1997 | (EP) . | |
| 2 197 647 | 3/1990 | (GB) . | |
| 63-12392 * | 1/1988 | (JP) .................................... 210/266 |
| 4-108589 * | 4/1992 | (JP) .................................... 210/188 |
| 4-156993 * | 5/1992 | (JP) .................................... 210/266 |
| WO 96/31440 | 10/1996 | (WO) . | |

* cited by examiner

Primary Examiner—Matthew O. Savage
(74) Attorney, Agent, or Firm—Silvy A. Murphy

(57) ABSTRACT

A gravity-flow water filtration cartridge is disclosed herein. The cartridge includes a housing having a compressed bed of ion-exchange resin disposed within an upper region thereof and a high surface area cyst-reducing filter element that is disposed within a lower thereof. The housing includes a middle chamber which separates the compressed bed of ion-exchange resin from the cyst-reducing filter element. The housing further includes a hydrophobic air vent conduit having an entry end that is positioned above a topmost surface of the cyst reducing filter element and an exit end that is positioned at least at a lowest surface of the cyst-reducing filter element, wherein the entry end includes a membrane having at least one hydrophobic side. The compressed bed of ion-exchange resin occupies at least 95% of the non-interstitial space between a top screen and a bottom screen of the filter, and after being filled with water, swells, and functions as a membrane to maintain a prime of the cyst-reducing filter element.

17 Claims, 2 Drawing Sheets

GRAVITY-FLOW WATER FILTRATION DEVICE

This application claims the benefit of U.S. Provisional Application No. 60/112,574, filed Dec. 17, 1998, entitled "Gravity-Flow Water Filtration Device and Method", by Willard A. Cutler.

FIELD OF THE INVENTION

The present invention relates to water filtration devices, which include a cyst-reducing water filter capable of reducing parasites and other impurities in drinking water and yet capable of delivering a substantial water flow rate at relatively low (gravity-assisted or gravity-flow) water pressures. While the invention may be used in other types of water filtration devices, it is especially suited for use in gravity-flow water carafes, and will be particularly described in that connection.

BACKGROUND OF THE INVENTION

Until recently, water filter carafes of commercially available design have not been capable of parasite reduction, which requires much finer filtration. Nor have they been effective for the significant reduction of organic chemicals, pesticides and insecticides, which requires more carbon. While such additional removal attributes are desirable, they have not been technically feasible in the filter sizes required and at the filter cost currently available in the market. In addition to the concerns about drinking water taste and odor, consumers are beginning to be more concerned with the quality of drinking water, thus increasing the demand for gravity-flow filter carafes. This is because such water filter carafes are relatively low in cost and operate in a simple manner. Water from a tap is simply poured into the top of the filtration unit and is allowed to flow through a replaceable filter cartridge to a treated water reservoir for later use.

A typical commercially available cyst-reducing water filter cartridge consists of a filter housing which contains a packed bed mixture of ion-exchange resin for the removal of unwanted ions, for example, lead, copper, and hard water ions, as well as carbon granules for the removal of adsorbable/catalyzable constituents such as chlorine and undesirable tastes and odors. Further, the filter housing contains a high surface area cyst-reducing filter element that is capable of removing harmful parasites and dirt that are present in water from a municipal water source. Without the cyst-reducing filter element, the housing containing the packed bed mixture that is commercially available for use in gravity-flow water carafes typically have physical volumes on the order of 165 $cm^3$ (10 $in^3$). This suggests that a filter incorporating the additional cyst function using the current designs would require more volume than that mentioned above. Gravity cyst-reducing filters should be able to achieve the production of a reasonable quantity of filtered water in a reasonable time, preferably, approximately 1 liter in less than 12 minutes.

Although filter designs and materials capable of cyst reduction exist, significant problems remain concerning appropriate methods and designs for incorporating such filters into effective, gravity-assisted water carafe purification systems. In order to sustain adequate flow rates throughout the life of the filter, the design must be such that air entrapment within the filter must be minimized. In addition, the design should be such that either a hydrophilic or a hydrophobic microporous cyst-reducing filter element can be used to sustain maximum flow rates. Maximum flow rates are achieved when water has displaced the air in the filter pores. This displacement of air from the pores and its replacement with water can be referred to as priming and when this displacement process is complete the filter is referred to as being in the primed state. The maximum flow rate is achieved when the filter element remains in the primed state. The filter cartridge design should allow the cyst-reducing filter element to remain in the primed state, that is, the pores remain filled with water at all times. The inventive combination of a filter cartridge design which allows both proper cartridge venting and which keeps the filter primed is essential to a successful filter.

A design in which only one of the two factors is present will reduce flow. Designs which only allow the filter to remain in its primed state, but which neglect venting promote the development of air locks beneath the packed bed of ion-exchange resin which significantly diminishes or stops the water flow rate. Air locks can come from two sources, entrapped air bubbles and dissolved air. The tap water out of a faucet that is introduced into the filters is typically less than 55° F. Moreover, the tap water usually is directed first through an aerator which mixes air with the water and creates water that is full of bubbles. Some air enters the filter cartridge in the form of these bubbles, which penetrate into the filter cartridge and can coalesce with other bubbles to form larger bubbles which cannot get back out, thus, forming air locks within the cartridge. Secondly, air can enter and move through the cartridge in the form of dissolved oxygen and nitrogen. As the water temperature reaches room temperature or above the temperature of the original tap water, the solubility of these two gases decreases and the gases come out of the water, thus, forming air locks in the filter cartridge. Furthermore, designs which allow venting, but do not keep the filter in the primed state do not produce the maximum flow of water through the cartridge.

In light of the foregoing, it is desirable to provide a water filtration device that can provide a reduction of very fine particulate biological cysts and other impurities from drinking water. Also, it is desirable to provide a water filtration device that can deliver substantial volumes of filtered water at relatively low water pressures. In addition, it is desirable to provide a water filtration device that maintains the cyst-reducing filter element in a primed condition and prohibits the development of air locks, thus, providing an adequate filter flow rate. Furthermore, it is desirable to provide a water filtration device that promotes the removal of any air trapped within the filtration device itself and a filtration device that also prevents any water from bypassing the cyst-reducing filter element. Finally, it is desirable to provide a water filtration device that is replaceable and cost effective in the market place.

SUMMARY OF THE INVENTION

Accordingly, the present invention is directed to a water filtration device that substantially obviates one or more of the limitations and disadvantages of the related art. The principal advantage of the present invention is the provision of an arrangement which overcomes the limitations and disadvantages of the described prior arrangements. Additional features and advantages of the invention will be set forth in the description that follows, and in part will be apparent from the description, or may be learned by practice of the invention. The objectives and other advantages of the invention will be realized and attained by the apparatus particularly pointed out in the written description and claims hereof as well as the appended drawings.

To achieve these and other advantages and in accordance with the purpose of the invention, as embodied and broadly described, the water filtration device is a replaceable cyst-reducing water filter cartridge for use in a water filter carafe. The filter cartridge comprises a filter cartridge housing wherein a top rim of the housing is adapted for attachment to an untreated water reservoir receptacle of a water carafe. The housing further includes a compressed bed of ion-exchange resin that is disposed within an upper region and proximate to the top rim of the filter housing, wherein the compressed bed of ion-exchange resin is bounded at the top with a top screen and is bounded at the bottom with a bottom screen, wherein each of the top screen and the bottom screen is in full contact with the compressed bed of ion-exchange resin. The housing further includes a high surface area cyst-reducing filter element that is disposed within a lower region and proximate to a bottom rim of the housing, wherein the cyst-reducing filter element provides at least 99.95% removal of 3–4 $\mu$m particles when tested in accordance with NSF standard 53, Drinking Water Treatment Units—Health Effects (September 1997). The housing includes a middle chamber which separates the compressed bed of ion-exchange resin from the cyst-reducing filter element and the housing includes at least one hydrophobic air vent conduit connected to the lower region of the housing, preferably, less than 1 mm in diameter. The hydrophobic air vent conduit has an entry end that is positioned above a topmost surface of the cyst-reducing filter element and an exit end that is positioned at least at a lowest surface of the cyst-reducing filter element, wherein the compressed bed of ion-exchange resin occupies at least 95% of the non-interstitial space between the top screen and the bottom screen of the filter housing. Furthermore, the compressed bed of ion-exchange resin and the cyst-reducing filter element each correspond in shape to the shape of the filter housing. Furthermore, in a preferred embodiment, the cyst-reducing filter element comprises a cellular honeycomb structure having a plurality of channels separated by porous channel walls, wherein the channels traverse the cyst-reducing filter element from a filter inlet end to a filter outlet end, and include a first plurality of channels open only at the inlet end and a second plurality of channels open only at the outlet end, and where the cellular honeycomb structure is made of ceramic. In an alternative embodiment, the cellular ceramic honeycomb structure further comprises activated carbon.

In one aspect of the invention, the cyst-reducing filter cartridge includes a hydrophobic air vent conduit that is disposed within the lower region of the housing, with the entry end opening into the first chamber and the exit end opening into a bottom area below the lowest surface of the cyst-reducing filter element. In yet another aspect of the invention, the cyst-reducing filter cartridge further comprises a plurality of hydrophobic air vent conduits that are disposed within the lower region of the housing, with each of the entry ends opening into the first chamber and each of the exit ends opening into a bottom area below the lowest surface of the cyst-reducing filter element.

In yet another aspect of the invention, the cyst-reducing filter cartridge comprises a cellular ceramic honeycomb structure with at least one pin hole traversing a plugged channel of the honeycomb structure from a water inlet end to a water outlet end. The pin hole serves as a hydrophobic air vent conduit. Furthermore, in yet another embodiment, the cyst-reducing filter cartridge comprises a carbon impregnated cellular honeycomb structure with a plurality of pin holes traversing the channels of the honeycomb structure from a water inlet end to a water outlet end.

In another aspect of the invention, a cyst-reducing water filtration device is provided that comprises the cyst-reducing filter cartridge in accordance with the present invention. The water filtration device further comprises a water filter carafe having an untreated water reservoir and a treated water reservoir and a water filter cartridge housing, wherein a top rim of the housing is adapted for attachment to an untreated water reservoir receptacle of a water carafe. The housing further includes a compressed bed of ion-exchange resin that is disposed within an upper region and proximate to the top rim of the filter housing, wherein the compressed bed of ion-exchange resin is bounded at the top with a top screen and is bounded at the bottom with a bottom screen, wherein each of the top screen and the bottom screen is in full contact with the compressed bed of ion-exchange resin. The housing further includes a high surface area cyst-reducing filter element that is disposed within a lower region and proximate to a bottom rim of the housing, wherein the cyst-reducing filter element provides at least 99.95% removal of 3–4 $\mu$m particles when tested in accordance with NSF standard 53, Drinking Water Treatment Units—Health Effects (September 1997). The housing includes a middle chamber which separates the compressed bed of ion-exchange resin from the cyst-reducing filter element and the housing includes at least one hydrophobic air vent conduit having an entry end and an exit end. The entry end is positioned above the topmost surface of the cyst-reducing filter element and the exit end is positioned at least at the lowest surface of the cyst-reducing filter element.

Finally, a method of making a cyst-reducing filtration cartridge for use in a water filter carafe is provided. A high surface area cyst-reducing filter element that provides at least 99.95% removal of 3–4 $\mu$m particles when tested in accordance with NSF standard 53, Drinking Water Treatment Units—Health Effects (September 1997) is attached to a filter cartridge housing proximate to a bottom surface of the housing. A bottom screen is attached proximate to and above the cyst-reducing filter element . A bed of ion-exchange resin is placed on top of the bottom screen and a top screen is used to forcefully compress the bed of ion-exchange resin onto the bottom screen, whereby the compressed bed of ion-exchange resin occupies at least 95% of the non-interstitial space between the top screen and the bottom screen. A hydrophobic air vent conduit having an entry end and an exit end is connected to the housing, wherein the entry end faces the topmost surface of the cyst-reducing filter element and the exit end faces the lowest surface of the cyst-reducing filter element. In a preferred embodiment of the method, the high surface area cyst-reducing filter element comprises a cellular honeycomb structure having a plurality of channels separated by porous channel walls, wherein the channels traverse the cyst-reducing filter element from a filter inlet end to a filter outlet end, and include a first plurality of channels open only at the inlet end and a second plurality of channels open only at the outlet end, and where the cellular honeycomb structure is made of ceramic. In an alternative embodiment, the cellular ceramic honeycomb structure provided further comprises activated carbon.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrating embodiments of the invention, and together with the description serve to explain the objects, advantages, and principles of the invention.

DESCRIPTION OF THE PREFERRED EMBODIMENTS

The invention disclosed herein generally embodies the provision of a water filtration device containing a cyst-reducing water filter cartridge. More specifically, an aspect of the invention resides in providing a replaceable water filter cartridge that provides at least 99.95% removal of 3–4 µm particles when tested in accordance with NSF Standard 53, Drinking Water Treatment Units—Health Effects (September 1997) and provides an adequate filtration water flow rate at relatively low (gravity-assisted) water pressures. As used herein, the terms "gravity-flow" and "gravity-assisted" refer to the natural flow of water under the influence of the earth's gravitational forces. Furthermore, the term "cyst-reducing filter element" refers to a filter that provides at least 99.95% removal of 3–4 µm particles when tested in accordance with NSF Standard 53, Drinking Water Treatment Units—Health Effects (September 1997). Furthermore, as used herein, the term "compressed bed of ion-exchange resin" refers to a bed of resin that is formed by placing the ion-exchange resin onto a bottom screen and then forcefully pressing the ion-exchange resin with a top screen, whereby the ion-exchange resin occupies at least 95% of the non-interstitial space between the top screen and the bottom screen within a filter cartridge housing.

Figure 1:
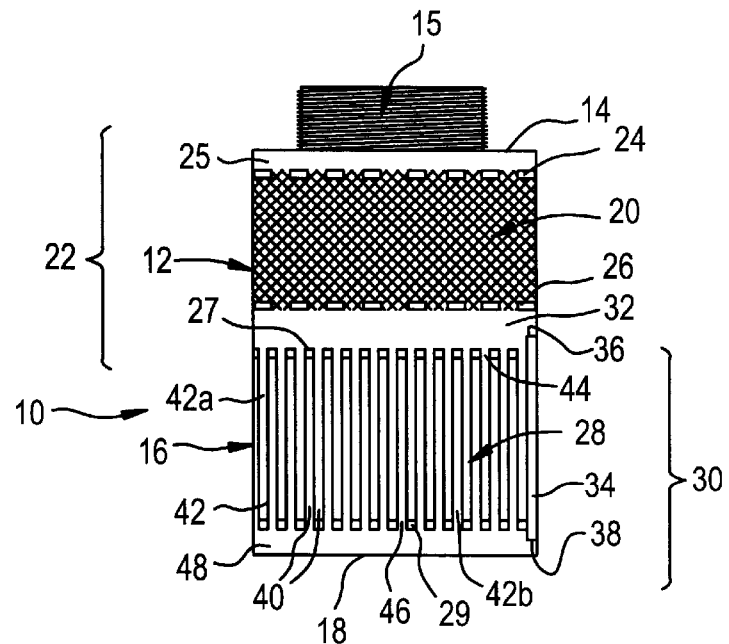
FIG. 1 is a schematic side view of a filter cartridge design in accordance with an embodiment of the present invention.

Reference will now be made in detail to the present preferred embodiments of the invention, examples of which are illustrated in the accompanying drawings. Turning to the drawings, like numerals indicate the same or similar elements in each of the several views. The drawings are not intended to indicate scale or relative proportions of the elements shown therein. FIG. 1 depicts the cyst-reducing, straight flow-through (that is, without any gooseneck conduits or weirs) filter cartridge of the present invention, which is designated generally by reference numeral 10. As shown in FIG. 1, the filter cartridge 10 is intended to be used in a water carafe (not shown in any of the diagrams). The filter cartridge 10 is typically enclosed in a filter housing 12, which has a top rim 14, a side surface 16 and a bottom rim 18. The top rim 14 is adapted for attachment to an untreated water reservoir receptacle (also not shown) of a water carafe, whereas, the bottom rim 18 opens into and is in fluid communication with a treated water reservoir (also not shown) of the water carafe. Furthermore, the filter housing 12 comprises a compressed bed of ion-exchange resin 20 that is disposed within an upper region 22 and proximate to the top rim 14 of the filter housing 12. The compressed bed of ion-exchange resin 20 is bounded at the top with a top screen 24 and is bounded at the bottom with a bottom screen 26, with each of the top screen 24 and the bottom screen 26 being in full contact with the compressed bed of ion-exchange resin 20 and where each of the top screen 24 and the bottom screen 26 are attached to the side surface 16 of the filter housing 12. The filter housing 12, further comprises a top chamber 25 that separates the top rim 14 of the filter housing 12 from the top screen 24. Moreover, a high surface area cyst-reducing filter element 28 is disposed within a lower region 30 and proximate to the bottom rim 18 of the filter housing 12. The cyst-reducing filter element 28 provides at least 99.95% removal of 3–4 µm particles when tested in accordance with NSF standard 53, Drinking Water Treatment Units—Health Effects (September 1997). Also, the filter housing 12 has a middle chamber 32 that separates the compressed bed of ion-exchange resin 20 from the cyst-reducing filter element 28. In addition, in one embodiment of the invention as shown in FIG. 1, the filter housing 12 has at least one hydrophobic air vent conduit 34 that is connected to the lower region 30 of the filter housing 12. The hydrophobic air vent conduit 34 has an entry end 36 that is positioned above a topmost surface of the cyst-reducing filter element 28 and an exit end 38 that is positioned at or below a lowest surface 29 of the cyst-reducing filter element 28.

The way that the filter cartridge 10 operates is that the filter cartridge 10 is placed in a receptacle of an untreated water reservoir of a filtration device, such as a water carafe (not shown). A treated water reservoir or pitcher of the carafe is partially filled with water from a faucet. The filter cartridge 10 is primed by placing the untreated water reservoir with the attached filter cartridge 10 in the treated water reservoir, as in normal use. Water enters through the bottom of the cyst-reducing filter element 28 and flows in a reverse manner through the cyst-reducing filter element 28 displacing air before it. This action also wets the compressed resin bed 20 allowing it to swell in preparation for adsorption/exchange. Once the filter cartridge 10 has been primed, the compressed bed of ion-exchange resin 20 of the present invention acts as a membrane, thus, preventing the water level from dropping below the level of the top screen 24 and the top surface of the compressed bed of ion-exchange resin 20. The membrane action of the compressed bed of ion-exchange resin 20 is comparable to a finger that is placed over a straw full of water to hold the water in the straw. During the course of normal use of the filter cartridge 10, the unfiltered water from the tap enters the filter cartridge 10 through the top rim 14 of the filter housing 12 and passes sequentially, first, through the compressed bed of ion-exchange resin 20, then through the middle chamber 32, then through the cyst-reducing filter element 28, and out through the bottom rim 18 of the filter housing 12 and into the treated water reservoir of the water carafe.

Of significance in the present invention is the configuration of the compressed bed of ion-exchange resin 20 shown in FIG. 1. As previously stated, the compressed bed is achieved by taking an ion-exchange resin mixture and placing the mixture on top of the bottom screen 26. Then the top screen 24 is forcefully pressed on to the ion-exchange resin mixture, thus, forming the compressed bed of ion-exchange resin 20, which is packed so tightly that the compressed bed of ion-exchange resin 20 cannot rearrange itself within the filter housing 12. The compressed bed of ion-exchange resin 20, as a result of being compressed, occupies at least 95% of the non-interstitial space between the top screen 24 and the bottom screen 26. Furthermore, the configuration of the compressed bed of ion-exchange resin 20 contributes to the membrane action and is what helps maintain prime in the cyst-reducing filter element 28 by essentially maintaining the level of water at the top of the compressed bed of ion-exchange resin 20, thus, keeping the cyst-reducing filter element 28 fully submerged in water. In addition, for cartridges used in conjunction with a high surface area cyst filter element 28, which does not incorporate activated carbon, the compressed bed of ion-exchange resin also comprises carbon granules for reducing any undesirable tastes and odors from the drinking water.

Figure 2:
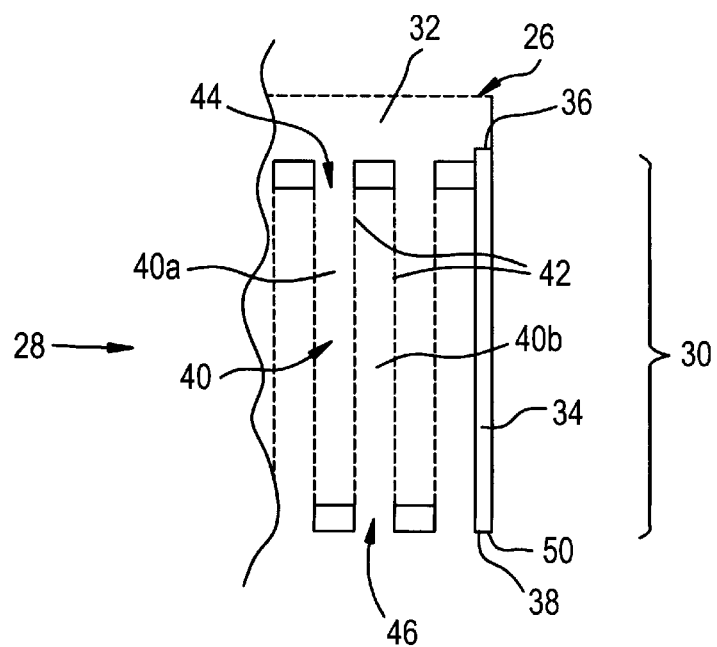
FIG. 2 is a partial schematic side view of an embodiment of the cyst-reducing filter element incorporated into the filter cartridge design of FIG. 1.

Further, of significance, as shown in FIGS. 1 and 2, is the high surface area cyst-reducing filter element 28, which in the preferred embodiment comprises a cellular honeycomb structure. In particular, as shown in FIG. 2, the honeycomb structure includes a plurality of channels 40 that are separated by porous channel walls 42, with the channels 40 traversing the cyst-reducing filter element 28 from a filter inlet end 44 to a filter outlet end 46, and include a first plurality of channels 40*a* open only at the inlet end 44 and a second plurality of channels 40*b* open only at the outlet end 46, therefore, the honeycomb structure has alternate channels that are plugged. With respect to the cyst-reducing filter element 28, although in each of the preferred embodiments the cyst-reducing filter element 28 is a cellular honeycomb structure, the cyst-reducing filter element 28 may be formed of any of a variety of different materials that offer porosity sufficiently fine to provide effective cyst reduction. More importantly, the cyst-reducing filter element 28 must offer a high surface area in order to ensure adequate water filtration rates under gravity conditions alone. For instance, in the present invention, the cyst-reducing filter element 28 achieves cyst reduction mainly due to the characteristics of the walls 42 of the channels 40 that traverse the cyst-reducing filter element 28. More specifically, the walls 42 of the channels 40 are configured to have a porosity characterized by a median pore diameter of less than 6 microns, and a primed water flux of at least about 10 ml/min/cm$^3$ under a water pressure of 0.3 psig. Some desirable materials that the cyst-reducing filter element 28 may be formed of include porous ceramics, porous carbon, composite materials of organic/organic, organic/inorganic, inorganic/inorganic composition and polymer or molecular sieve membranes, each of which can provide at least 99.95% removal of 3–4 $\mu$m particles when tested in accordance with NSF standard 53, Drinking Water Treatment Units—Health Effects (September 1997). In particular, the micro-porous filters known to be effective for cyst reduction during water filtration are ceramic honeycomb filters, carbon-based honeycomb filters, fiber mat filters incorporating glass, ceramic and/or polymer fibers, and pleated polymer membrane filters. In a preferred embodiment, the cyst-reducing filter element 30 is a cellular ceramic honeycomb structure that further consists of more than 15% by weight of activated carbon for reducing any undesirable tastes and odors from drinking water.

Further, as shown in FIG. 1, in an embodiment of the invention, the bottom rim 18 provides a bottom area 48 which separates the lowest surface 29 of the cyst-reducing filter element 28 from the lowest plane of the bottom rim 18 of the filter housing 12. However, the bottom area 48 is not an essential feature of the invention. Additionally, as shown in FIG. 1, the top rim 14 further comprises an adapter 15 for easy attachment to the untreated water reservoir receptacle of a water filter carafe (not shown). The adapter 15 provides a water-tight seal at the top rim 14 of the filter housing 12, thus, preventing any untreated water from leaking in through the sides of the filter housing 12. Although, the adapter 15 is shown as having integral threads wrapped therearound, other configurations will be apparent to those skilled in the art.

Moreover, in a preferred embodiment of the invention, the hydrophobic air vent conduit 34 itself is made of a hydrophobic material, thus, making it energetically unfavorable for water to wet the side walls of the hydrophobic air vent conduit 34 and to travel down the hydrophobic air vent conduit 34 and, hence, to bypass the cyst-reducing filter element 28. As shown in FIG. 2, the hydrophobic air vent conduit 34 is preferably disposed within the filter housing 12, proximate to the cyst-reducing filter element 28, which is not shown in FIG. 2 for purposes of simplification. As shown, the entry end 38 of the hydrophobic air vent conduit 34 is positioned above the topmost surface 27 of the cyst-reducing filter element 28 and the exit end 36 is placed below the lowest surface 29 of the cyst-reducing filter element 28. In particular, the entry end 36 of the hydrophobic air vent conduit 34 opens into the middle chamber 32 and the exit end 38 is positioned in the bottom area 48 of the filter housing 12. The way that the hydrophobic air vent conduit 34 operates is that as air bubbles build up under the bottom screen 26, the air bubbles will coalesce and eventually grow large enough to fill up the middle chamber 32. Eventually, if unchecked, the air bubbles will impinge upon the cyst-reducing filter element 28, thus, obstructing the flow process by filling the cyst-reducing filter element 28 with air. However, since the entry end 36 of the hydrophobic air vent conduit 34 is located above the cyst-reducing filter element 28, for instance, in the middle chamber 32, the hydrophobic air vent conduit 34 provides a path for the air bubbles to leave the middle chamber 32 without impinging upon the cyst-reducing filter element 28. The hydrophobic air vent conduit 34 keeps the bubble size at a steady state. Furthermore, although the hydrophobic air vent conduit 34 is shown in FIGS. 1–4 as being disposed inside the filter housing 12, the hydrophobic air vent conduit 34 can also be attached to the outside of the filter housing 12. Regardless of whether the hydrophobic air vent conduit 34 is placed inside or outside of the filter housing 12, the entry end 36 of the hydrophobic air vent conduit 34 must be positioned above the topmost surface 27 of the cyst-reducing filter element 28. The exit end 36 may be placed anywhere at or below the lowest surface 29 of the cyst-reducing filter element 28, either inside or outside the filter housing 12.

Figure 3:
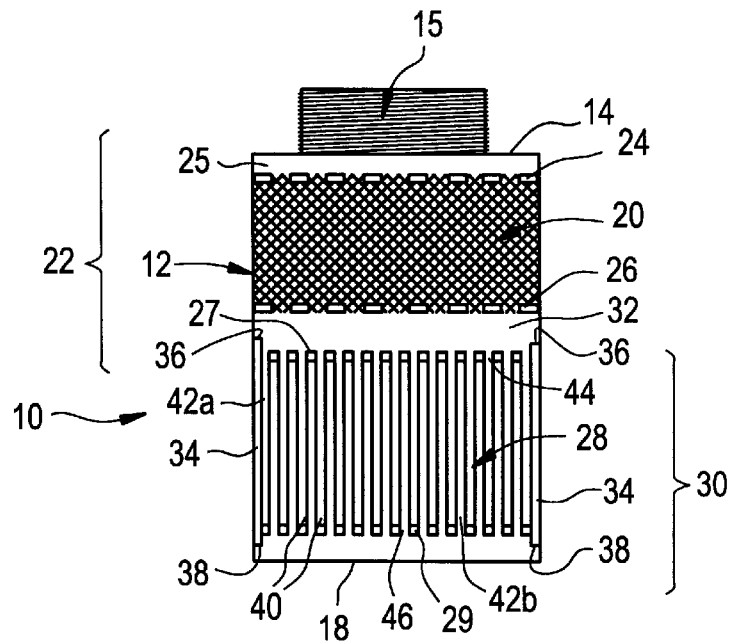
FIG. 3 is a schematic side view of a filter cartridge design in accordance with an embodiment of the present invention.
Figure 4:
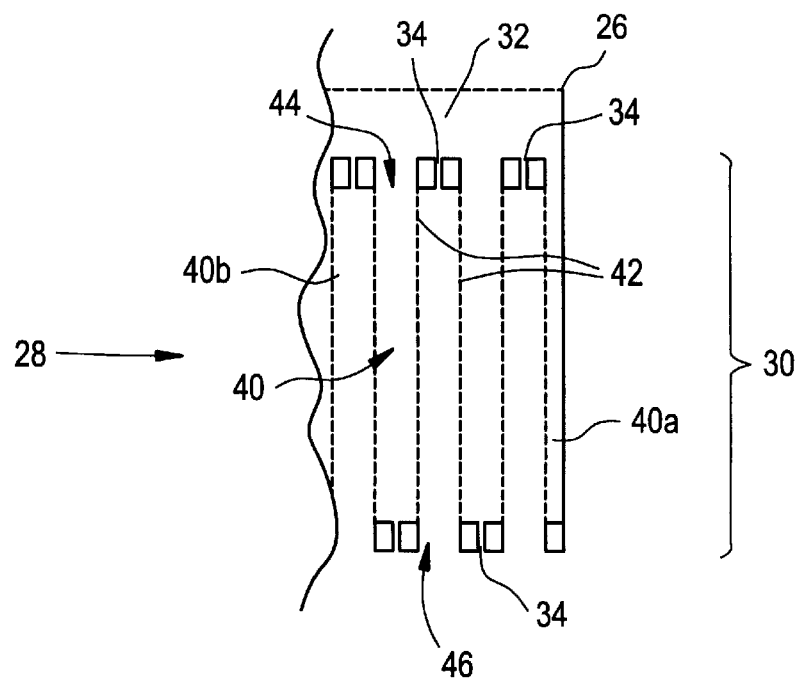
FIG. 4 is a schematic side view of a filter cartridge design in accordance with an embodiment of the present invention.

Alternatively, a plurality of hydrophobic air vent conduits 34 can be provided, where all of the hydrophobic air vent conduits are connected to the lower region 30 of the filter housing 12, as shown in FIG. 3. Preferably, each of the entry ends 36 of the hydrophobic air vent conduits 34 is disposed above the topmost surface 27 of the cyst-reducing filter element 28, preferably in the middle chamber 32 of the filter housing 12, such that any air that is trapped in the middle chamber 32 can enter the entry ends 36 and can leave the filter housing 12 through the exit ends 38, preventing any reduction in the water filtration rate. In yet another embodiment, as shown in FIG. 4, a hydrophobic air vent conduit can also be provided by perforating a pin hole 34 in one or more of the hydrophobic plugs in the water inlet end 34 of the cyst-reducing filter element 28 that is made of a carbon impregnated cellular honeycomb structure. Since a carbon impregnated honeycomb structure is largely a hydrophobic body, the pin hole essentially serves as a hydrophobic air vent conduit, thus, only allowing air to pass through the cyst-reducing filter element 28, but preventing any water from passing through the cyst-reducing filter element 28. Moreover in all cases, the inner diameter of the hydrophobic air vent conduit 34 must be small, preferably, less than 1 mm in diameter, to prevent either cyst-contaminated water or an excess amount of air from traveling down the tube. The cyst-contaminated water bypass would defeat the purpose of the cartridge and an excess venting of air would enable the filter cartridge 10 to lose its prime.

Moreover, in another embodiment, the exit end 38 is covered with a membrane 50 that has at least one hydrophobic side facing the outside of the hydrophobic air vent conduit 34. The hydrophobic side of the membrane 50 further ensures that any cyst-filled water does not bypass the cyst-reducing filter element 28 via the hydrophobic air vent conduit 34 and, hence, cause any contamination of the water in the treated water reservoir of the carafe. The membrane 50 is attached to the hydrophobic air vent conduit 34 with a commercially available waterproof adhesive. Further, in the preferred embodiment of the invention, as shown in FIGS. 1–4, the compressed bed of ion-exchange resin 20 and the cyst-reducing filter element 28 each correspond in shape to the shape of the filter cartridge housing 12. Although in the preferred embodiment, the filter cartridge housing 12 is cylindrical, other configurations will be apparent to those skilled in the art. Moreover, each of the compressed bed of ion-exchange resin 20 and the cyst-reducing filter element 28 fit snugly into the filter housing 12 in order to prevent the bypassing of any cyst-filled water. Also, as shown in FIGS. 1–4, the compressed bed of ion-exchange resin 20 is substantially parallel to the cyst-reducing filter element 28.

Finally, a method of making a cyst-reducing filtration cartridge 10 for use in a water filter carafe is provided. A high surface area cyst-reducing filter element 28 that provides at least 99.95% removal of 3–4 $\mu$m particles when tested in accordance with NSF standard 53, Drinking Water Treatment Units—Health Effects (September 1997) is attached to a filter cartridge housing 12 proximate to a bottom surface 18 of the housing. A bottom screen 26 is attached proximate to and above the cyst-reducing filter element 28. A bed of ion-exchange resin 20 is placed on top of the bottom screen 26 and a top screen 24 is used to forcefully compress the bed of ion-exchange resin 20 onto the bottom screen 26, whereby the compressed bed of ion-exchange resin 20 occupies at least 95% of the non-interstitial space between the top screen 24 and the bottom screen 26. A hydrophobic air vent conduit 34 having an entry end 36 and an exit end 38 is connected to the housing 12, wherein the entry end 36 faces a topmost surface 27 of the cyst-reducing filter element 28 and the exit end 38 faces a lowest surface 29 of the cyst-reducing filter element 28. In a preferred embodiment of the method, the high surface area cyst-reducing filter element comprises a cellular honeycomb structure having a plurality of channels 40 separated by porous channel walls 42, wherein the channels 40 traverse the cyst-reducing filter element 28 from a filter inlet end 44 to a filter outlet end 46, and include a first plurality of channels 40*a* open only at the inlet end and a second plurality of channels 40*b* open only at the outlet end, and where the cellular honeycomb structure provided is made of ceramic. In an alternative embodiment, the cellular ceramic honeycomb structure provided further comprises activated carbon.

Accordingly, the inventive design allows for the combination of the compressed bed of ion-exchange resin 20 and at least one hydrophobic air vent conduit 34 in the filter cartridge 10. Without the compressed bed of ion-exchange resin 20, which acts a membrane to stop the flow of water at the top of the compressed bed 20, the high surface area cyst filter element 28 element 28 would loose its prime, thus, causing a reduction of the water filtration rate. Without the hydrophobic air vent conduit 34, the filter housing 12 would develop air pockets, which would eventually grow large enough that they would impinge on the high surface area cyst-reducing filter element 28 and result in a severe reduction in water flow.

In the preferred embodiment, all of the parts of the filter housing 12, including the hydrophobic air vent conduit 34, are made of injection moldable plastic material. The bed of ion-exchange resin 20 used in the preferred embodiment is a resin mixture containing a macroporous weak acid cation exchange resin capable of removing unwanted ions. Also, in the preferred embodiment, the top screen 24 and the bottom screen 26 are made of polyester or some other material capable of retaining resins while still maintaining high water flows. Moreover, in the embodiments which contain a membrane, the membrane 50 used is a material sold under the brand name of GORE-TEX®, however, other substitute materials for the membrane 50 will be apparent to those skilled in the art. Furthermore, the attachment of the various elements to the filter housing 12 is accomplished by using a commercially available waterproof adhesive, heat or ultrasonic welding.

Although a preferred embodiment of this invention and certain variations thereof have been described herein, various modifications and variations will be apparent to those skilled in the art without departing from the spirit or scope of the invention. Thus, it is intended that the present invention cover the modifications and variations of this invention provided they come within the scope of the appended claims and their equivalents.

What is claimed is:

1. A replaceable gravity-flow cyst-reducing water filtration cartridge, comprising:

a filter cartridge housing having a top rim, a side surface and a bottom rim, said top rim being adapted for attachment to an untreated water reservoir receptacle of a water carafe, said bottom rim being in fluid communication with a treated reservoir of said water carafe, said filter housing, further comprising:

a compressed bed of ion-exchange resin disposed within an upper region and proximate to said top rim of said filter housing, said compressed bed of ion-exchange resin being bounded at the top with a top screen and being bounded at the bottom with a bottom screen, each of said top screen and said bottom screen being in full contact with said compressed bed of ion-exchange resin;

a high surface area cyst-reducing filter element disposed within a lower region and proximate to said bottom rim of said filter housing, said cyst-reducing filter element providing at least 99.95% removal of 3–4 $\mu$m particles when tested in accordance with NSF standard 53, Drinking Water Treatment Units—Health Effects (September 1997);

a middle chamber separating said compressed bed of ion-exchange resin from said cyst-reducing filter element; and at least one hydrophobic air vent conduit connected to said lower region of said filter housing, said hydrophobic air vent conduit having an entry end and an exit end, said entry end being positioned above a topmost surface of said cyst-reducing filter element, said exit end being positioned at least at a lowest surface of said cyst-reducing filter element;

wherein said compressed bed of ion-exchange resin occupies at least 95% of a non-interstitial space between said top screen and said bottom screen of said filter housing.

2. The replaceable gravity-flow cyst-reducing water filter cartridge of claim 1, wherein said high surface area cyst-reducing filter element comprises a cellular honeycomb structure having a plurality of channels separated by porous channel walls, wherein said channels traverse said cyst-reducing filter element from a filter inlet end to a filter outlet end, and include a first plurality of channels open only at said inlet end and a second plurality of channels open only at said outlet end.

3. The replaceable gravity-flow cyst-reducing water filtration cartridge of claim 2, wherein said cellular honeycomb structure further comprises activated carbon.

4. The replaceable gravity-flow cyst-reducing water filtration cartridge of claim 1, wherein said compressed bed of ion-exchange resin further comprises carbon granules.

5. The replaceable gravity-flow cyst-reducing water filtration cartridge of claim 4, wherein said cellular honeycomb structure is made of ceramic.

6. The replaceable gravity-flow cyst-reducing water filtration cartridge of claim 1, wherein said bottom rim further provides a bottom area separating said cyst-reducing filter element from a lowest portion of said bottom rim of said filter housing.

7. The replaceable gravity-flow cyst-reducing water filtration cartridge of claim 1, wherein said hydrophobic air vent conduit is disposed within said filter housing and proximate to said cyst-reducing filter element, said entry end of said hydrophobic air vent conduit being disposed within said middle chamber and said exit end of said hydrophobic air vent conduit being disposed within a bottom area.

8. The replaceable gravity-flow cyst-reducing water filtration cartridge of claim 1, wherein said hydrophobic air vent conduit is connected to an outside of said filter housing.

9. The replaceable gravity-flow cyst-reducing water filtration cartridge of claim 1, wherein said compressed bed of ion-exchange resin is substantially parallel to said cyst-reducing filter element.

10. The replaceable gravity-flow cyst-reducing water filtration cartridge of claim 1, wherein said exit end of said hydrophobic air vent conduit further comprises a membrane that has at least one hydrophobic side that faces an outside of said hydrophobic air vent conduit.

11. The replaceable gravity-flow cyst-reducing water filtration cartridge of claim 10, wherein said hydrophobic membrane is secured to said exit end of said air vent conduit with a waterproof adhesive.

12. The replaceable gravity-flow cyst-reducing water filtration cartridge of claim 1, wherein said compressed bed of ion-exchange resin and said cyst-reducing filter element each correspond in shape to said filter cartridge housing, and wherein each of said compressed bed of ion-exchange resin and said cyst-reducing filter element fit snugly into said filter housing.

13. The replaceable gravity-flow cyst-reducing water filtration cartridge of claim 1, wherein said filter housing further comprises a plurality of hydrophobic air vent conduits, each of said hydrophobic air vent conduits being connected to said lower region of said filter housing.

14. The replaceable gravity-flow cyst-reducing water filtration cartridge of claim 13, wherein each of said vent conduits further comprises an entry end and an exit end, wherein each of said entry ends open above said topmost surface of said cyst-reducing filter element, and wherein each of said exit ends open at least at said lowest surface of said cyst-reducing filter element.

15. The replaceable gravity-flow cyst-reducing water filtration cartridge of claim 1, wherein said top rim comprises an adapter for attachment to said untreated water reservoir receptacle of said water carafe.

16. The replaceable gravity-flow cyst-reducing water filtration cartridge of claim 1, wherein said filter housing further comprises a top chamber separating said top rim of said filter housing from said top screen.

17. A replaceable gravity-flow cyst-reducing water filtration cartridge, comprising:

a filter cartridge housing having a top rim, a side surface and a bottom rim, said top rim being adapted for attachment to an untreated water reservoir receptacle of a water carafe, said bottom rim being in fluid communication with a treated reservoir of said water carafe, said filter housing, further comprising:

a compressed bed of ion-exchange resin disposed within an upper region and proximate to said top rim of said filter housing, said compressed bed of ion-exchange resin being bounded at the top with a top screen and being bounded at the bottom with a bottom screen, each of said top screen and said bottom screen being in full contact with said compressed bed of ion-exchange resin;

a hydrophobic cellular honeycomb cyst-reducing filter element having a plurality of channels separated by porous channel walls, wherein said channels traverse said cyst-reducing filter element from a filter inlet end to a filter outlet end, and include a first plurality of channels open only at said inlet end and a second plurality of channels open only at said outlet end, said cyst-reducing filter element providing at least 99.95% removal of 3–4 $\mu$m particles when tested in accordance with NSF standard 53, Drinking Water Treatment Units—Health Effects (September 1997), said cyst-reducing filter element being disposed within a lower region and proximate to said bottom rim of said filter housing;

a middle chamber separating said compressed bed of ion-exchange resin from said cyst-reducing filter element; and wherein said hydrophobic cellular honeycomb cyst-reducing filter element further comprises at least one pin hole traversing said cyst-reducing filter element from one of said filter inlet ends of one of said second plurality of channels to one of said filter outlet ends of the same one of said second plurality of channels, said pin hole being less than 1 mm in diameter, and wherein said compressed bed of ion-exchange resin occupies at least 95% of a non-interstitial space between said top screen and said bottom screen of said filter housing.

* * * * *